(12) United States Patent
Fukuda et al.

(10) Patent No.: US 8,646,873 B2
(45) Date of Patent: Feb. 11, 2014

(54) INK JET RECORDING APPARATUS

(71) Applicant: Seiko Epson Corporation, Tokyo (JP)

(72) Inventors: Masako Fukuda, Shiojiri (JP);
Tomohiro Sayama, Matsumoto (JP);
Nagatoshi Kasahara, Matsumoto (JP);
Hironori Sato, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/775,710

(22) Filed: Feb. 25, 2013

(65) Prior Publication Data

US 2013/0222477 A1 Aug. 29, 2013

(30) Foreign Application Priority Data

Feb. 28, 2012 (JP) ................................ 2012-042074

(51) Int. Cl.
*B41J 2/165* (2006.01)

(52) U.S. Cl.
USPC .................................. 347/35; 347/33; 347/60

(58) Field of Classification Search
USPC ................. 347/16, 29, 33, 34, 35, 37, 60, 90, 347/95–100, 102
See application file for complete search history.

(56) References Cited

U.S. PATENT DOCUMENTS

| 6,746,100 B2 * | 6/2004 | Imai et al. ........................ 347/35 |
| 2005/0151815 A1 | 7/2005 | Kanai et al. |

FOREIGN PATENT DOCUMENTS

WO 2004/094150 11/2004

\* cited by examiner

*Primary Examiner* — Thinh Nguyen
(74) *Attorney, Agent, or Firm* — Harness, Dickey & Pierce, P.L.C.

(57) ABSTRACT

There is provided an ink jet recording apparatus including: first cleaning which performs non-recording ejection of ink for ink jet recording to an ink receiving medium and cleans a nozzle and a nozzle surface of a print head; second cleaning which moves the print head to the ink receiving medium, performs non-recording ejection of the ink for ink jet recording from the print head to the ink receiving medium under a condition that the amount of the ink for ink jet recording is smaller than an amount of the ink ejected in the non-recording ejection by the first cleaning and an execution frequency is higher than that in the first cleaning, and cleans the nozzle of the print head; and a wiping mechanism which wipes the nozzle surface by using a wiping member.

8 Claims, 2 Drawing Sheets

FIG. 1

INK JET RECORDING APPARATUS

Priority is claimed under 35 U.S.C. §119 to Japanese Application No. 2012-042074 filed on Feb. 28, 2012, which is hereby incorporated by reference in its entirety.

BACKGROUND

1. Technical Field

The present invention relates to an ink jet recording apparatus.

2. Related Art

In the related art, a printing method using an ink jet recording scheme is performed by causing ink droplets to fly and adhere onto a recording medium such as a paper. By innovative progress in an ink jet recording scheme technique in recent years, a printing method using the ink jet recording scheme has been used even in a field of high-definition image recording (image printing), in which photographs and offset printing have been used so far. Particularly, a technique for printing with solvent ink on a medium (recording medium) such as a film made of vinyl chloride for industrial use, which does not easily absorb ink, has been proposed.

For example, International Publication No. WO2004/094150 discloses an ink jet printer including: a printing unit which causes a print head to horizontally travel above a center of a platen; a transport unit which transport a medium, which has been delivered onto the platen, to a front side on the platen; a pre-heater which preliminarily heats the medium transported on a back portion of the platen toward a lower side of a travel route of the print head; a print heater which heats the medium, which has been delivered to the center of the platen on the lower side of the travel route of the print head, onto which ink droplets ejected from a nozzle of the print head are to be jetted; and a temperature control unit which controls heating temperature of the pre-heater and the print heater for heating the medium such that surface temperature of the medium, which has been delivered to the center of the platen, onto which solvent ink droplets ejected from the nozzle of the print head are to be jetted, ranges from 30° C. to 70° C. In addition, International Publication No. WO2004/094150 also discloses that main components of the solvent ink to be supplied to the print head, which occupies 40% by weight or more, consist of ethylene glycol monobutyl ether and propyleneglycol monomethylether acetate and that the ink jet printer further includes a refresh mode unit which moves the print head to a maintenance station, causes the nozzle of the print head to eject ink droplets as a trial, and thereby prevents clogging of solidified solvent ink in the nozzle of the print head.

However, the ink jet printer disclosed in International Publication No. WO2004/094150 has a problem that at least one of continuous recording stability and intermittent recording stability deteriorates.

SUMMARY

An advantage of some aspects of the invention is to provide an ink jet recording apparatus which is excellent both in continuous recording stability and in intermittent recording stability.

As a result of an intensive study, the present inventors discovered the following points. First, it is necessary to warm a recorded surface to about 45° C. to 60° C. by some method in an ink jet recording apparatus which mounts ink containing resin, in order to cause the ink to be coated with a membrane on a recording medium, which does not easily absorb ink, and solidify the ink thereon. On this occasion, the head is heated by radiation heat from the recording surface, and a nozzle surface, which faces the recording medium, of a nozzle plate is heated. Then, the nozzle surface is further heated as compared with an ordinary ink jet recording apparatus, and a meniscus is easily dried in nozzles which do not eject ink. Moreover, ink is easily dried and solidified near the nozzles in the case of the nozzles which do not eject ink, and recording tends to be unstable.

In addition, since ink containing resin has a property of being coated with a membrane, jetting easily gets distorted when the ink recovers from a thickened state. Moreover, ink temperature rises in nozzles which eject the ink, the viscosity thereof is lowered, and therefore, tailing easily occurs. Then, satellites (minute ink droplets which are separated parts of tails of the ink droplets) are generated from the ink droplet, changed into mist, fly back to an upper side, and easily adhere to the nozzle surface. The satellites are generated when several ink droplets are bonded, and more easily generated as the viscosity of the ink is lowered. Here, the "mist" represents extremely minute ink droplets which float in the ink jet recording apparatus without reaching the recording medium despite being generated from the head.

Since the above mist easily adheres to and solidifies near the nozzles which are currently ejecting ink containing resin, recording tends to be unstable. Moreover, the feature that the used ink is easily coated with a membrane and solidified, results in the solidification of the mist which has flown back to the nozzle surface, the solidified mist disturbs ejection, and the recording (image formation) becomes unstable. Since an ink composition which is suitable for printing on an ink non-absorbable or low-absorbable recording medium such as plastic does not contain high-boiling point solvents such as glycerin in order to realize quick drying, instability of recording significantly appears.

Thus, the present inventors further studied. As a result, the present inventors discovered that it was possible to obtain excellent recording stability even when continuous recording or intermittent recording continued, by performing predetermined cleaning or wiping at a predetermined interval during recording. In addition, the present inventors discovered that it was possible to solve the above problem by obtaining excellent recording stability even when continuous recording or intermittent recording continued, by making it possible to reliably discharge thickened ink and remove the mist which had flown back.

That is, the invention is as follows.

[1] An ink jet recording apparatus including: a print head which ejects ink for ink jet recording, which contains resin and substantially does not contain alkyl polyol whose boiling point under 1 atmospheric pressure is 280° C. or higher from a nozzle formed on a nozzle surface to a recording medium; a heating mechanism which heats the recording medium positioned in a region in which the ejected ink for ink jet recording adheres; first cleaning which moves the print head to an ink receiving medium, performs non-recording ejection of the ink for ink jet recording from the print head to the ink receiving medium, and cleans the nozzle and the nozzle surface of the print head; second cleaning which moves the print head to the ink receiving medium, performs non-recording ejection of a smaller amount of the ink for ink jet recording than an amount of the ink ejected in the non-recording ejection by the first cleaning from the print head to the ink receiving medium at a higher execution frequency, and cleans the nozzle of the print head; and a wiping mechanism which wipes the ink adhering to the nozzle surface by using a wiping member.

[2] The ink jet recording apparatus according to [1], wherein the wiping member is a cloth wiping sheet.

[3] The ink jet recording apparatus according to [1] or [2], wherein when the first cleaning is performed, the wiping member wipes the nozzle surface.

[4] The ink jet recording apparatus according to any one of [1] to [3], wherein the first cleaning is performed in units of predetermined time during recording, non-ejection time of the nozzle, or a number of pages.

[5] The ink jet recording apparatus according to any one of [1] to [3], wherein the first cleaning is configured such that at least one of an amount of ink ejected in the non-recording ejection or an execution frequency of the non-recording ejection is changeable and adjustable for each nozzle depending on a use frequency of each nozzle.

[6] The ink jet recording apparatus according to any one of [1] to [5], wherein the ink for ink jet recording contains wax.

[7] The ink jet recording apparatus according to any one of [1] to [6], wherein the wiping member does not wipe the nozzle surface when the second cleaning is performed.

[8] The ink jet recording apparatus according to any one of [1] to [7], wherein the second cleaning is performed for every pass.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a detailed description will be given of an embodiment for implementing the invention. In addition, the invention is not limited to the following embodiment and can have various modifications and implementations within the scope of the gist.

In this specification, "continuous recording stability" means a feature that ink ejection from nozzles is stable during recording for long time and image quality is stable. "Intermittent recording stability" means a feature that ejection and image quality are stable even when ink is ejected from nozzles after a state in which the ink is not ejected from the nozzles continues for long time.

In this specification, "(meth)acrylate" means at least one of acrylate and methacrylate corresponding thereto, and "(meth)acryl" means at least one of acryl or methacryl corresponding thereto, and "(meth)acryloyl" means at least one of acryloyl and methacryloyl corresponding thereto.

Ink Jet Recording Apparatus

An embodiment of the invention relates to an ink jet recording apparatus (hereinafter, simply referred to as a "recording apparatus").

An off-carriage type serial printer (hereinafter, simply referred to as a "printer") is exemplified as the ink jet recording apparatus, and a description will be given with reference to the drawings. Here, a serial printer is designed such that recording is performed while a head reciprocate in a direction which is perpendicular to a transport direction of a recording medium. Particularly, an off-carriage type serial printer is designed such that an ink cartridge and a head on a carriage are connected to each other by a tube.

In order to show each component with a recognizable size in the drawings used in the following description, each component is appropriately reduced in size.

Figure 1:
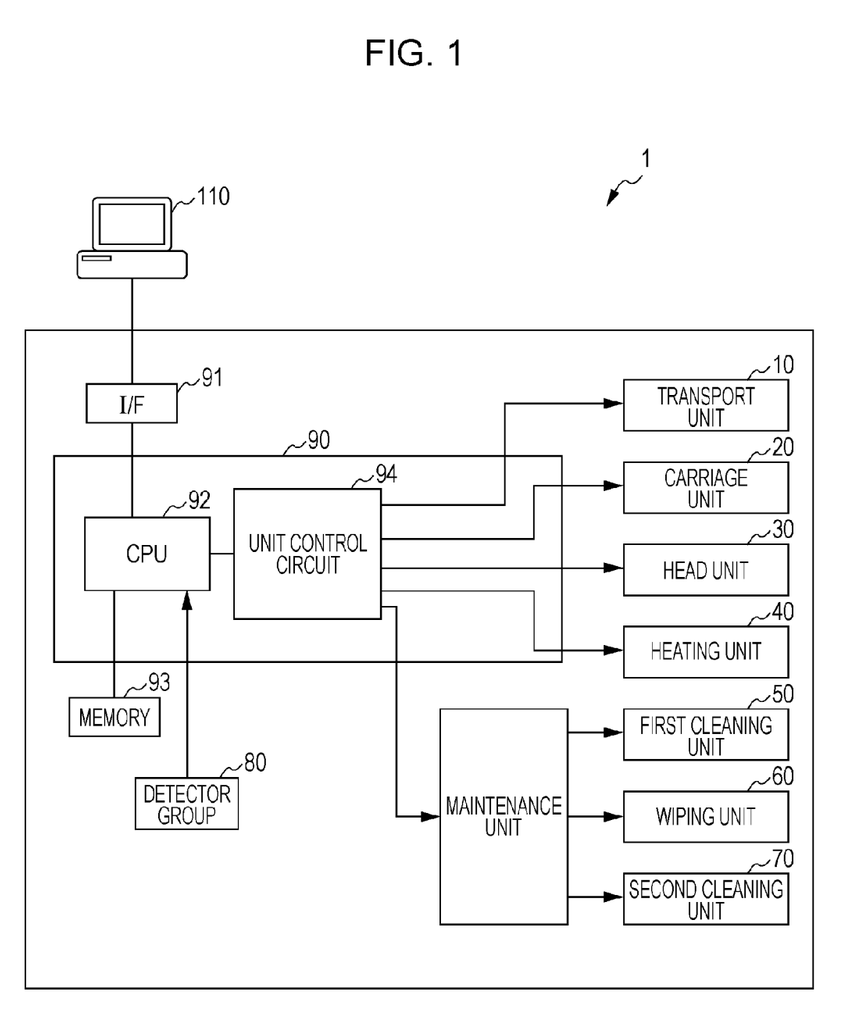
FIG. 1 is a block diagram showing a configuration of an ink jet recording apparatus according to an embodiment of the invention.
Figure 2:
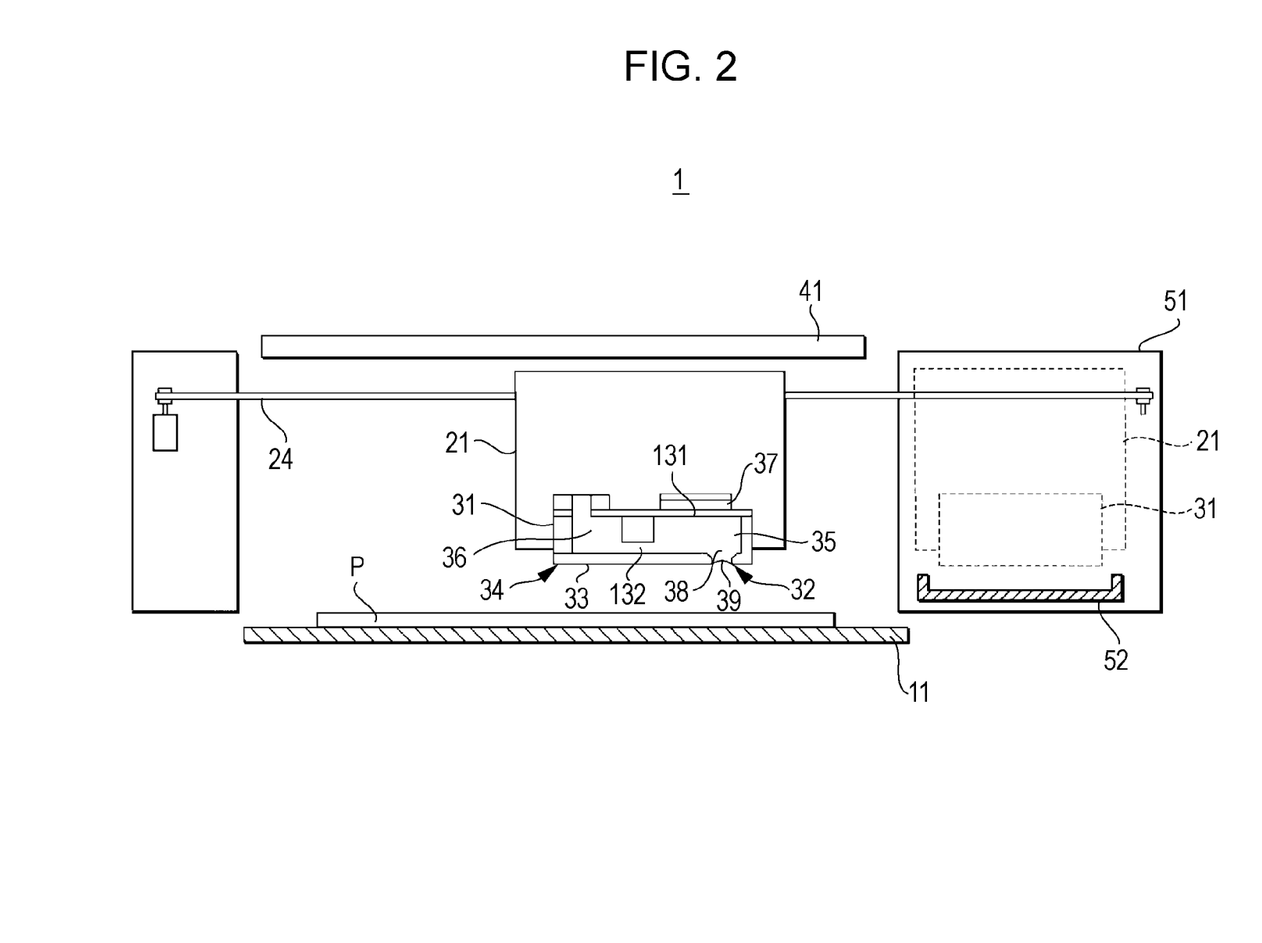
FIG. 2 is an outlined front view near a piezoelectric ink jet of the ink jet recording apparatus according to the embodiment of the invention.

FIG. 1 is a block diagram showing a configuration of a printer 1. FIG. 2 is an outlined front view near a piezoelectric ink jet of the printer 1.

The printer 1 according to this embodiment is an apparatus which forms an image on a recording medium P by ejecting ink for ink jet recording which contains resin (hereinafter, simply referred to as "resin ink") onto the recording medium P. Here, the printer 1 according to this embodiment can form an image by using ink of various colors, and for example, the printer 1 forms an image by using ink of four colors, namely CMYK, and a base which gives an excellent hiding property to the recording medium P by using white ink. Furthermore, the printer 1 applies clear ink onto the CMYK ink or the white ink, for example, and thereby enhances glossy appearance.

The printer 1 includes a transport unit 10, a carriage unit 20, a head unit 30, a heater unit (heating unit) 40, a maintenance unit which controls a first cleaning unit 50, a wiping unit 60, and a second cleaning unit 70, a detector group 80, and a controller 90 (the maintenance unit is shown in FIG. 1 though a reference numeral is not given thereto). The printer 1 receives recording data from a computer 110 which is an external apparatus, then causes the controller 90 to directly control the transport unit 10, the carriage unit 20, the head unit 30, and the heater unit (heating unit) 40, and causes the maintenance unit, which is controlled by the controller 90, to control the first cleaning unit 50, the wiping unit 60, and the second cleaning unit 70.

The controller 90 controls the respective units based on the recording data received from the computer 110 and prints an image on the recording medium P. A condition in the printer 1 is monitored by the detector group 80, and the detector group 80 outputs a detection result to the controller 90. The controller 90 controls the respective units based on the detection result output from the detector group 80.

The transport unit 10 is for transporting the recording medium P in a predetermined direction (hereinafter, referred to as a "transport direction" or a "sub-scanning direction"). The transport unit 10 includes a sheet supply roller (not shown), a transport motor (not shown), a transport roller (not shown), a platen 11, and a sheet discharge roller (not shown). The platen 11 supports the recording medium P on which recording is being carried out, and the recording medium P is supplied to a portion above the platen 11 by driving a sheet sending motor (not shown).

The carriage unit 20 is a moving mechanism which moves a head 31 relative to the recording medium P stopped in a recording region, namely causes the head 31 to scan the recording medium P, in a direction (hereinafter, referred to as a "moving direction" or a "main-scanning direction") which intersects the transport direction (sub-scanning direction) while causing the head 31 to eject resin ink. The carriage unit 20 includes a carriage 21 and a carriage motor (not shown). The carriage 21 is provided with a head 31 therein and is coupled to the carriage motor (not shown) via a timing belt (not shown). An ink cartridge (not shown) is mounted on a different location from a location of the carriage 21 and is accommodated in a cartridge accommodating unit (not shown) provided outside a main body of the printer 1 (outside of a moving range of the carriage 21). The ink cartridge and the carriage 21 are connected to each other with an ink supply tube (not shown). In such a case, the ink cartridge and the carriage 21 do not move together. In addition, the carriage 21 reciprocates along a guide axis 24 by the carriage motor in a state in which the carriage 21 is supported by the guide axis 24 which intersects the transport direction as will be described later. The guide axis 24 supports the carriage 21 such that the carriage 21 can freely reciprocate in an axial direction of the guide axis 24.

The head unit 30 is for ejecting the resin ink onto the recording medium P. The head unit 30 is provided with a head 31 which includes a nozzle 32. In addition, although the head 31 in FIG. 2 includes only a single nozzle 32, a head usually includes a plurality of nozzles. FIG. 2 shows a structure with a cavity in the piezoelectric ink jet head using a piezoelectric element. The head 31 includes a nozzle 32 which ejects the resin ink, the nozzle plate 34 which includes a nozzle surface 33 with a nozzle 32 formed therein, a cavity 35 which applies drive force for ejecting, a reservoir 36 which prevents reverse flow of the ink, and a piezoelectric element 37 which forms ink droplets suitable for ejection. Since the head 31 is provided on the carriage 21, the head 31 also moves in the moving direction when the carriage 21 moves in the moving direction. In addition, the resin ink is ejected onto the recording medium P while the head 31 moves in the moving direction. In so doing, a dot array along the moving direction is formed on the recording medium P. It is possible to simplify the recording apparatus by causing the head 31 to eject the resin ink onto the recording medium P as described above. The nozzle 32 includes a nozzle flow path 38 connected to the cavity 35 and a minute nozzle opening 39 (orifice) at an end of the nozzle flow path 38. In the nozzle opening 39 (orifice), an ink liquid surface called a meniscus is formed. The cavity 35 is a minute space filled with the resin ink and causes ink pressure and ink vibration flow as drive force for ejecting the resin ink. A side wall of the cavity 35 is formed of a vibration plate 131 and in contact with the piezoelectric element 37. The cavity 35 connects at least one ink supply path 132 to at least one nozzle flow path 35 (a single ink supply path 132 and a single nozzle flow path 35 are shown in FIG. 2). The ink supply path 132 connects the cavity 35 to the reservoir 36. The piezoelectric element 37 increases or decreases a volume of the cavity 35 by deforming the vibration plate 131 when a pulse is applied. By driving the piezoelectric element 37, an ink vibration flow is excited, the meniscus is pushed to eject the resin ink, and the meniscus is drawn to separate the resin ink droplets. The reservoir 36 is a liquid chamber which is connected to an ink supply tube from an ink tank outside the drawing and is also connected to the ink supply path 132 of the ejecting element which is configured by the nozzle 32, the cavity 35, and the piezoelectric element 37. A thin vibration membrane (not shown) is formed at a part of the wall surface of the reservoir 36 and passively deformed in accordance with ink pressure in the reservoir 36 to change the volume of the reservoir 36.

The heater unit (heating unit) 40 corresponding to a heating mechanism dries and fixes the resin ink by heating the resin ink adhering (jetted) onto the recording medium P. Dots formed on the recording medium P are heated and fixed (hardened) by the heating unit 40 and complete an image. The heating unit 40 heats the recording surface to about 45° C. to 60° C. in order to cause the resin ink to be coated with a membrane and fixes the resin ink on the recording medium P. The heating unit 40 is provided with a heater 41 on an upper side of the head 31, namely an opposite side to the recording medium P when viewed from the head 31. Examples of the heater 41 include an infrared heater, a hot air heater, and a warm air heater, and the infrared heater is particularly preferable since the infrared heater can uniformly heat the recording surface. One kind or two or more kinds of these heaters can be used alone or in combination.

In order to prevent the temperature of the carriage 21 and the head 31 from rising because of the heater 41, the carriage 21 or the head 31 may be covered with a heat insulating material or a heat releasing material (both are not shown). In addition, the heater 41 may be installed not on the upper side of the head 31 as shown in FIG. 2 but on the lower side of the head 31. As an example in which the heater is provided on the lower side of the head 31, there is an example in which the platen 11 is provided as a platen heater.

The first cleaning unit 50 corresponding to first cleaning moves the head 31 to an ink receiving medium 52 (more specifically, a case body 51), causes the head 31 to perform non-recording ejection of the resin ink onto the ink receiving medium 52, and cleans the nozzle 32 and the nozzle surface 33 of the head 31. Here, the "non-recording ejection" in this specification is also referred to as flashing, which does not mean ejection onto the recording medium P performed for the purpose of forming an image and means ejection onto the ink receiving medium 52 performed for the purpose of removing the excessively heated resin ink which may cause clogging.

The wiping unit 60 corresponding to a wiping mechanism wipes the nozzle surface 33 by using a wiping member, specifically, by pressing the wiping member against the nozzle surface 33. The wiping unit 60 preferably wipes the nozzle surface 33 by the wiping member, that is, preferably performs wiping when the first cleaning has been performed. The wiping may be performed after the first cleaning, and is preferably performed after the first cleaning. In addition, the wiping member is preferably a cloth wiping sheet.

The second cleaning unit 70 corresponding to second cleaning moves the head 31 to the ink receiving medium 52 (more specifically, the case body 51), causes the head 31 to eject a smaller amount of resin ink for the non-recording ejection as compared with the first cleaning unit 50 onto the ink receiving medium 52 at a higher execution frequency, and cleans the nozzle 32 of the head 31.

The detector group 80 includes a linear type encoder (not shown), a rotary type encoder (not shown), a sheet detecting sensor (not shown), and an optical sensor (not shown). The linear type encoder is for detecting a position of the carriage 21 in the moving direction. The rotary type encoder is for detecting rotational frequency of the transport roller (not shown). The sheet detecting sensor (not shown) is for detecting a position of a leading end of the paper (recording medium P) being supplied. The optical sensor (not shown) is for detecting presence of the recording medium P by a light emitting portion and a light receiving portion which are mounted on the carriage 21. In addition, the optical sensor (not shown) can detect the position of the end portion of the recording medium P while moved by the carriage 21 and detect a width of the recording medium P. Moreover, the optical sensor (not shown) can detect a leading end (an end portion on the downstream side in the transport direction, which is also referred to as an upper end) or a tail end (an end on the upstream side in the transport direction, which is also referred to as a lower end) of the recording medium P depending on a condition.

The controller 90 is a control unit (control section) for controlling the printer 1. The controller 90 includes an interface unit 91, a CPU 92, a memory 93, and a unit control circuit 94. The interface unit 91 exchanges data between a computer 110 which is an external apparatus and the printer 1. The CPU 92 is a computation processing apparatus for controlling the printer 1 as a whole. The memory 93 is for securing an area for storing a program of the CPU 92, a work area, and the like, and includes storage element such as a RAM or an EEPROM. The CPU 92 controls the respective units through the unit control circuit 94 based on the program stored in the memory 93.

The printer 1 shown in FIGS. 1 and 2 are configured as described above, and hereinafter, a detailed description will be given of operations of the printer 1.

First, the transport unit 10 transports the recording medium P on the platen 11 to a position at which the resin ink droplets ejected from the nozzle 32 of the head 31 can be jetted, namely a region in which the ejected resin ink is jetted (adheres). Then, the heater 41 provided in a heating mechanism (heating unit 40) heats the recording medium P which is present at the above position or in the above region. The heating condition by the heater 41 may be set such that temperature of the recording surface of the recording medium P, namely temperature of a surface of the recording medium P facing the nozzle surface 33 ranges from 45° C. to 60° C. In such a case, the rein ink is fixed to the recording surface of the recording medium P. In addition, the heating temperature of the heater 41 is not particularly limited and may be about 250° C. to 300° C., for example. In addition, timing of the heating operation is not limited to timing before the ejecting operation which will be described later, and the heating operation may be performed in parallel with the ejecting operation.

Thereafter, the head unit 30 causes the nozzle 32 of the head 31 to eject the resin ink onto the recording medium P which has been heated as described above, and the resin ink is jetted onto the recording surface. A known method in the related art can be used as the ejecting method, and particularly, it is possible to satisfactorily perform recording by a method of ejecting liquid droplets by using vibration of a piezoelectric element, namely a recording method using a head which forms ink droplets by mechanical deformation of an electrostrictive element. By heating the recording surface of the recording medium P up to predetermined temperature as described above, moisture and the like contained in the resin ink which has been ejected onto the recording surface of the recording medium P are rapidly evaporated and scattered, and a membrane is formed by resin contained in the resin ink. In so doing, it is possible to obtain an image of high quality, in which dried ink is solidly fixed (bonded) to the recording surface of the recording medium P and less ink bleeding is observed.

Here, when the resin ink is ejected toward the recording medium P, satellites are generated from the resin ink and easily changed into mist in the nozzle 32 which perform ejection. Since the mist does not reach the recording medium P and flies back to the upper side, the mist tends to adhere to the nozzle surface 33. Since the temperature of the nozzle surface 33 rises to about 40° C. to 55° C. due to an influence of radiation heat from the heated recording medium P, mist derived from the resin ink which adheres the nozzle surface 33 is easily dried and solidified (hardened).

On the other hand, the resin ink is further dried and easily solidified in the nozzle 32 which has not performed ejection for long time, particularly at a part of the nozzle opening 39. As a result, clogging easily occurs in the nozzle 32 which has not performed ejection for long time. Since there is a possibility of clogging due to drying of the resin ink or solidification of the mist near the nozzle 32 or on the nozzle surface 33 in any nozzles 32 regardless of whether or not ejection has been performed, there is a concern that ejection disorder occurs.

Thus, it is possible to prevent aforementioned clogging of the nozzle 32 by appropriately performing the first cleaning by the first cleaning unit 50 or the second cleaning by the second cleaning unit 70 depending on the state of the nozzle and the like. A detailed description will be given of such cleaning.

First, the resin ink solidification which can occur in the nozzle 32 performing ejection occurs at a relatively small scale since an image is recorded by ejection, the ink is constantly discharged, and fresh ink is supplied. In addition, there is a possibility that drying and solidification of the resin ink have not significantly advanced immediately after completion of idle running corresponding to 1 pass (one scanning of the head or the recording medium) in the nozzle 32 which has not performed ejection. For this reason, the maintenance unit controlled by the controller 90 (more specifically, the unit control circuit 94) operates the second cleaning unit 70 on all the nozzles 32 every predetermined period, preferably every time the power is turned on and every recording operation corresponding to one pass, or more preferably every recording operation corresponding to one pass. The head 31 (carriage 21) is moved to the ink receiving medium 52 (more specifically, the case body 51) provided outside the platen 11 along the guide axis 24. Then, the head 31 is caused to perform non-recording ejection of the resin ink toward the ink receiving medium 52, and the nozzle 32 is cleaned. The amount of the ink ejected in the non-recording ejection for the second cleaning may be such an amount that makes it possible to discharge resin ink near the nozzle 32 (mainly the nozzle flow path 38 and the nozzle opening 39). Here, the ink receiving medium 52 is not particularly limited to the following examples, but may be a receiving dish, urethane foam, a sponge, or an ink absorbable cloth or paper, for example.

In addition, the nozzle 32 which has not perform ejection for long time is substantially not supplied with fresh ink and is heated by the heater for long time. For this reason, the ink in the cavity 35 and the reservoir 36 in the head gradually dries even if the nozzle 32 is cleaned in the second cleaning. There is an undesirable concern that the solidified resin ink cannot be sufficiently removed due to a small amount of the ink ejected in the non-recording ejection even if the above second cleaning is performed on such a nozzle 32 for every pass. Thus, in such a case, the maintenance unit controlled by the controller 90 operates the first cleaning at a lower execution frequency instead of the above second cleaning. In the same manner as in the above second cleaning, the head 31 to be cleaned is moved to the ink receiving medium 52 (more specifically, the case body 51) provided outside the platen 11 along the guide axis 24 even in the first cleaning. Then, the head 31 is made to perform non-recording ejection of the resin ink toward the ink receiving medium 52 to clean a wider range near the nozzle 32 and the nozzle surface 33 nearby. According to this embodiment, the amount (ml) of the ink ejected in the non-recording ejection for the first cleaning is an amount (ml) corresponding to 80% or more of the cavity of the head. In addition, the amount of the ink ejected in the non-recording ejection is preferably an amount (ml) corresponding to 100% or more of the cavity of the head, and more preferably an amount (ml) corresponding to 150% or more of the cavity of the head. The amount of the ink ejected in the non-recording ejection for the first cleaning is larger than that for the aforementioned second cleaning.

On the other hand, since the solidification of the resin ink caused in the nozzle 32, which has performed ejection, also occurs on the nozzle surface 33 near the nozzle 32 due to the mist as well as the vicinity of the nozzle 32 in many cases, the resin ink is solidified at a relatively large scale over a wide range. In such a case, it is possible to remove the solidified ink adhering to the nozzle surface 33 by wiping the mist by the wiping mechanism (wiping unit 60) every predetermined time during the recording, specifically before a large amount of the mist which has flown back to the nozzle surface 33 is accumulated thereon.

The wiping mechanism (wiping unit 60) can remove the mist generated from the satellites during the recording and also remove the mist generated by the operations for the second cleaning and the first cleaning by executing the wiping after the first cleaning performed every predetermined time.

The first cleaning is preferably performed in units of predetermined time during the recording, nozzle non-ejection time, or a number of pages, and it is particularly preferable to perform the first cleaning every predetermined time during the recording. By operating the first cleaning in predetermined units or at a predetermined interval as described above, it is possible to operate the first cleaning at timing which is further suitable for the ink state.

The first cleaning is preferably configured such that at least one of the amounts of the ink ejected in the non-recording ejection and the execution frequency can be changed and adjusted for each nozzle depending on the usage frequency of each nozzle. In such a case, it is possible to define an optimal amount of the ink ejected in the first cleaning for each nozzle depending on the non-ejection time and to thereby minimize the amount of the ink wastage.

Here, since the amount of the aforementioned mist is large when the non-recording ejection is performed by operating the first cleaning, a large amount of mist tends to adhere to the nozzle surface 33 after the non-recording ejection. Thus, it is preferable to operate the wiping mechanism (wiping unit 60) when the operation of the first cleaning has been performed. The wiping mechanism is for wiping the ink adhering to the nozzle surface 33 by pressing the wiping member against the nozzle surface 33 as described above. In so doing, the mist adhering on the nozzle surface 33 and the resin ink which has already dried or almost dried near the nozzle 32 can be effectively removed, and excellent recording stability can be achieved.

The wiping mechanism preferably performs wiping after the operation of the first cleaning as described above and may or may not perform wiping after the operation of the second cleaning. However, it is preferable that the wiping member preferably does not wipe the ink adhering to the nozzle surface 33, that is, the wiping member preferably does not perform wiping after the second cleaning is performed, in order to realize high-speed printing. More specifically, the wiping is preferably performed after the first cleaning is performed, and the wiping is preferably not performed after the second cleaning is performed.

The above wiping member is not limited to the following example, but may be a cloth wiping sheet or a rubber wiping blade, for example. Particularly, the cloth wiping sheet with a large wiping area is preferable since there is no concern that the meniscus is damaged even if the cloth wiping sheet is in contact with the meniscus and the cloth wiping sheet can effectively wipe the solidified ink adhering to the nozzle surface 33.

By causing the maintenance unit controlled by the controller 90 to detect the use state and the clogging state of the nozzle 32 and appropriately perform the first cleaning or the second cleaning, it is possible to prevent the solidification of the resin ink in the nozzle 32 of the head 31 and clogging of the nozzle 32 while securing high-speed printing, and it is thus possible to prevent the occurrence of dot defects at a part of an image formed on the recording surface of the recording medium P by using the clogged head 31.

Recording Medium

The recording apparatus according to this embodiment is particularly suitable for ink jet recording by using an ink non-absorbable or low-absorbable recording medium. Specifically, the resin ink used in this embodiment is suitable for ink jet recording on the ink non-absorbable or low-absorbable recording medium in terms of the composition thereof as will be described later.

In this specification, the "ink non-absorbable or low-absorbable recording medium" means "a recording medium with an amount of water absorption for 30 msec$^{1/2}$ after start of contact based on the Bristow method is 10 mL/m$^2$ or less". The Bristow method is a most distributed method as a method for measuring an amount of liquid absorption for short time and is also employed by Japan Technical Association of the Pulp and Paper Industry (JAPAN TAPPI). The standard No. 51 "Paper and Board-Liquid Absorbability Test Method-Bristow Method" in "JAPAN TAPPI Paper and Pulp Test Method in 2000 version" describes the detail of the method.

The ink non-absorbable recording medium is not limited to the following examples, but may be a plastic film on which surface treatment for ink jet recording has not been performed (that is, an ink absorbable layer has not been formed), a base material such as a paper coated with plastic, or a base material to which a plastic film is bonded, for example. The plastic is not particularly limited, and examples of the plastic include polyvinyl chloride, polyethylene terephthalate, polycarbonate, polystyrene, polyurethane, polyethylene, and polypropylene. Examples of the ink low-absorbable recording medium include an actual printing paper such as an art paper, a coated paper, or a matte paper.

Modification Examples of Embodiment

The aforementioned recording apparatus is an off-carriage type serial printer. When a large capacity ink tank is additionally provided outside the printer 1 though not shown in the drawings, the large capacity ink tank and the ink cartridge are connected to each other by an ink supply tube. In so doing, it is possible to greatly increase a storage amount of resin ink even in the off-carriage type printer 1 in the same manner as in an on-carriage type printer.

In addition, the recording apparatus according to this embodiment may be an on-carriage type serial printer in which an ink cartridge (ink tank) is mounted on the carriage 21 along with the head 31. In the case of the on-carriage type, the carriage 21 detachably holds the ink cartridge (not shown) for accommodating the resin ink therein.

According to this embodiment, it is possible to provide an ink jet recording apparatus which is excellent both in continuous recording stability and in intermittent recording stability while realizing high-speed printing when the resin ink is recorded on an ink non-absorbable or low-absorbable recording medium, in particular, based on an ink jet scheme as described above.

Ink for Ink Jet Recording

An embodiment of the invention relates to ink for ink jet recording. The ink for ink jet recording (hereinafter, also referred to as "resin ink") is preferably used in the ink jet recording apparatus according to the above embodiment, and the composition thereof contains resin and substantially does not contain glycerin. The resin is not limited to the following examples, but may be resin dispersing agent which will be described later, resin emulsion, and wax, for example, and is preferably wax. In this specification, wax means both wax in the form of emulsion and not in the form of emulsion if not mentioned otherwise.

In addition, the ink for ink jet recording substantially does not include alkyl polyols whose boiling point under 1 atmospheric pressure is 280° C. or higher. If alkyl polyols whose boiling point under 1 atmospheric pressure is 280° C. or higher are included, a drying property of the ink significantly deteriorates. As a result, shading unevenness in an image clearly appears on various recording medium, particularly an ink non-absorbable or low-absorbable recording medium, and an ink fixing property cannot be obtained. Examples of alkyl polyols whose boiling point under 1 atmospheric pressure is 280° C. or higher include glycerin whose boiling point under 1 atmospheric pressure is 290° C.

The expression "substantially does not include" in this specification means that a larger amount of substance than an amount with which addition of the substance sufficiently brings about some effect is not contained. From a quantitative standpoint, it is preferable that 1.0% by mass or more of alkyl polyol be not contained, more preferable that 0.5% by mass or more of alkyl polyol be not contained, further preferable that 0.1% by mass or more of alkyl polyol be not contained, further preferable that 0.05% by mass or more of alkyl polyol be not contained, and particularly preferable that 0.01% by mass or more of alkyl polyol be not contained, and the most preferable that 0.001% by mass or more of alkyl polyol be not contained, with respect to the total mass (100% by mass) of the resin ink.

Hereinafter, a description will be given of additive (component) which is or may be contained in the resin ink according to the embodiment.

Colorant

The resin ink according to the embodiment may contain colorant. The colorant is selected from pigment and dye.

Pigment

In the embodiment, it is possible to enhance light resistance of the resin ink by using pigment as the colorant. Any of inorganic pigment and organic pigment can be used as the pigment.

The inorganic pigment is not particularly limited, and may be carbon black, iron oxide, or titanium oxide, for example.

The above carbon black is not particularly limited, and may be furnace black, lamp black, acetylene black, and channel black (C.I. PIGMENT BLACK 7), for example. In addition, Examples of a commercialized product of the carbon black include No. 2300, 900, MCF88, No. 20B, No. 33, No. 40, No. 45, No. 52, MA7, MA8, MA100, No. 2200B (all of which are product names and manufactured by Mitsubishi Chemical Corporation), COLOR BLACK FW1, FW2, FW2V, FW18, FW200, S150, S160, S170, PRINTEX 35, U, V, 140U, SPECIAL BLACK 6, 5, 4A, 4, 250 (all of which are product names and manufactured by Degussa AG), CONDUCTEX SC, RAVEN 1255, 5750, 5250, 5000, 3500, 1255, 700 (all of which are product names and manufactured by Columbian Carbon Japan Ltd), and REGAL 400R, 330R, 660R, MOGUL L, MONARCH 700, 800, 880, 900, 1000, 1100, 1300, 1400, ELFTEX 12 (all of which are product names and manufactured by Cabot Corporation).

One kind or two or more kinds of inorganic pigment may be used alone or in combination.

The organic pigment is not particularly limited, and may be quinacridone type pigment, quinacridone quinine type pigment, dioxazine type pigment, phthalocyanine type pigment, anthrapyrimidine type pigment, anthranthrone type pigment, indanthrone type pigment, flavanthrone type pigment, perylene type pigment, diketo-pyrrolo-pyrrole type pigment, perinone type pigment, quinophthalone type pigment, anthraquinone type pigment, thioindigo type pigment, benzimidazolone type pigment, isoindolinone type pigment, azomethine type pigment, and azo type pigment, for example. Specific examples of the organic pigment include the following pigment.

Examples of pigment used for cyan ink include C.I. PIGMENT BLUE 1, 2, 3, 15, 15:1, 15:2, 15:3, 15:4, 15:6, 15:34, 16, 18, 22, 60, 65, 66, and C.I. VAT BLUE 4, 60. Particularly, at least one of C.I. PIGMENT BLUE 15:3 and 15:4 is preferable.

Examples of pigment used for magenta ink include C.I. PIGMENT RED 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, 264, and C.I. PIGMENT VIOLET 19, 23, 32, 33, 36, 38, 43, 50. Particularly, one or more kind selected from a group consisting of C.I. PIGMENT RED 122, C.I. PIGMENT RED 202, and C.I. PIGMENT VIOLET 19.

Examples of pigment used for yellow ink include C.I. PIGMENT YELLOW 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, 213. Particularly, one or more kind selected from a group consisting of C.I. PIGMENT YELLOW 74, 155, and 213 is preferable.

In addition, as pigment used for ink of other colors than the above colors, such as green ink and orange ink, pigment known in the related art is exemplified.

An average particle size of the pigment is preferably 250 nm or less since it is possible to suppress clogging of the nozzle and achieve further satisfactory ejection stability. The average particle size in this specification is based on volume. As a measurement method, it is possible to measure the average particle size by a grain size distribution measurement apparatus based on a laser differential scattering method, for example, as a measurement principle. Examples of the grain size distribution measurement apparatus include a grain size analyzer (for example, Microtrac UPA manufactured by Nikkiso Co., Ltd.) based on a dynamic light scattering method as a measurement principle.

Dye

According to this embodiment, dye can be used as the colorant. The dye is not particularly limited, and acid dye, direct dye, reactive dye, and basic dye can be used. The dye is not particularly limited to the following example, and may be C.I. ACID YELLOW 17, 23, 42, 44, 79, 142, C.I. ACID RED 52, 80, 82, 249, 254, 289, C.I. ACID BLUE 9, 45, 249, C.I. ACID BLACK 1, 2, 24, 94, C.I. FOOD BLACK 1, 2, C.I. DIRECT YELLOW 1, 12, 24, 33, 50, 55, 58, 86, 132, 142, 144, 173, C.I. DIRECT RED 1, 4, 9, 80, 81, 225, 227, C.I. DIRECT BLUE 1, 2, 15, 71, 86, 87, 98, 165, 199, 202, C.I. DIRECT BLACK 19, 38, 51, 71, 154, 168, 171, 195, C.I. REACTIVE RED 14, 32, 55, 79, 249, and C.I. REACTIVE BLACK 3, 4, 35.

In addition, content of the colorant is preferably 1.5% by mass to 6% by mass with respect to the total mass (100% by mass) of the resin ink.

Resin Dispersing Agent

It is preferable that the pigment can be stably dispersed and held in water when the resin ink is made to contain the above pigment. Although such a dispersing method is not particularly limited, a method of dispersing the pigment by using resin dispersing agent such as water-soluble resin or water dispersible resin (hereinafter, the pigment treated by the method will be referred to as "resin dispersing pigment") is mainly exemplified. Particularly, water-soluble resin is preferable due to excellent dispersing stability.

Here, the above water-soluble resin may be used not only for the resin dispersing agent but also for another use. In other words, the resin ink according to this embodiment is applicable as long as the resin ink contains the water-soluble resin regardless of the use. Accordingly, the water-soluble resin may be added (pre-addition) in a stage in which the pigment dispersed liquid is prepared before the resin ink is prepared if the water-soluble resin is used as resin dispersing agent, for example, while the water-soluble resin may be added (post-addition) as one component when the resin ink is prepared if the water-soluble resin is used for the purpose of enhancing a fixing property and scrubbing resistance, for example.

It is possible to enhance at least any of adhesiveness between the recording medium and the resin ink and the adhesiveness between the solidified articles in the resin ink when the resin ink adheres to the recording medium, in particular, by causing the resin ink to contain the resin dispersing pigment.

The water-soluble resin is not limited to the following examples, but may be polyvinyl alcohols, poly(meth)acrylic acid, (meth)acrylic acid-acrylonitrile copolymer, vinyl acetate-(meth)acrylic acid ester copolymer, (meth)acrylic acid-(meth)acrylic acid ester copolymer, styrene-(meth) acrylic acid copolymer, styrene-methacrylic acid-acrylic acid ester copolymer (for example, methacrylic acid-butylacrylate-styrene-hydroxyethyl acrylate), styrene-α-methylstyrene-(meth)acrylic acid copolymer, styrene-α-methylstyrene-(meth)acrylic acid-(meth)acrylic acid ester copolymer, styrene-maleinic acid copolymer, styrene-maleinic anhydride copolymer, vinylnaphthalene-(meth)acrylic acid copolymer, vinylnaphthalene-maleinic acid copolymer, vinyl acetate-maleinic acid ester copolymer, vinyl acetate-crotonic acid copolymer, and vinyl acetate-(meth)acrylic acid copolymer, and salts thereof. Examples of the form of the copolymer, any form of random copolymer, block copolymer, alternate copolymer, and graft copolymer can be used.

The salts are not limited to the following examples, but may be ammonia, ethylamine, diethylamine, triethylamine, propylamine, isopropylamine, dipropylamine, butylamine, isobutylamine, diethanolamine, triethanolamine, triisopropanolamine, aminomethylpropanol, and a salt with a basic compound such as morpholine, for example. An additive amount of such a basic compound is not particularly limited as long as the additive amount is equal to or larger than neutralization equivalent amount.

The molecular weight of the resin dispersing agent is preferably within a range from 1,000 to 100,000 as weight-average molecular weight, and more preferably within a range from 3,000 to 10,000. If the molecular weight is within the above range, stable dispersion of the pigment in water can be achieved, and viscosity control when the pigment is applied to the resin ink is facilitated.

In addition, an acid number is preferably within a range from 50 to 300 and more preferably within a range from 70 to 150. If the acid number is within the range, it is possible to stably secure the dispersing property of the pigment in water and enhance water resistance of the recorded substance recorded by using the resin ink which contains the pigment.

In addition, a commercialized product may be used as the above water-soluble resin. Specific examples of the commercialized product include JONCRYL 67 (weight-average molecular weight: 12,500, acid number: 213), JONCRYL 678 (weight-average molecular weight: 8,500, acid number: 215), JONCRYL 586 (weight-average molecular weight: 4,600, acid number: 108), JONCRYL 611 (weight-average molecular weight: 8,100, acid number: 53), JONCRYL 680 (weight-average molecular weight: 4,900, acid number: 215), JONCRYL 682 (weight-average molecular weight: 1,700, acid number: 238), JONCRYL 683 (weight-average molecular weight: 8,000, acid number: 160), JONCRYL 690 (weight-average molecular weight: 16,500, acid number: 240) (all of which are product names and manufactured by BASF Japan Ltd.).

The additive amount of the resin dispersing agent with respect to the pigment is preferably from 1 part by mass to 100 parts by mass and more preferably from 5 parts by mass to 50 parts by mass with respect to 100 parts by mass of the pigment. If the additive amount is within the above range, it is possible to secure satisfactory dispersing stability of the pigment in water.

A method of dispersing the above resin dispersing pigment in water can be implemented by adding the pigment, water, and the resin dispersing agent, and further, water-soluble organic solvent and neutralize, as necessary, and using a disperser. Examples of the disperser include ball mill, sand mill, attritor, roll mill, agitator mill, a Henschel mixer, a colloid mill, ultrasonic homogenizer, jet mil, and ang mill which have been used in the related art. As for the level of the dispersion, the resin dispersing pigment may be dispersed until the average particle size of the pigment preferably ranges from 20 nm to 500 nm and more preferably ranges from 50 nm to 200 nm. In such a case, the dispersing stability of the pigment in the water is further enhanced.

One kind or two or more kinds of the resin dispersing agent may be used along or in combination. In addition, the content of the resin dispersing agent is not particularly limited and may be appropriately decided as necessary.

Resin Emulsion

The resin ink according to this embodiment may contain resin emulsion. The resin emulsion exhibits an effect that the resin ink is sufficiently fixed to the recording medium and scrubbing resistance of an image is enhanced, by forming resin membrane with the wax when the recording medium is heated. For this reason, the resin emulsion is preferably thermoplastic resin. By the above effect, the image formed by using the resin ink which contains the resin emulsion has excellent scrubbing resistance on the ink non-absorbable or low-absorbable recording medium.

In addition, the resin emulsion which functions as binder is contained in the resin ink in an emulsion state. By containing the resin, which functions as binder, in the resin ink in the emulsion state, the viscosity of the resin ink is easily adjusted to an appropriate range for the ink jet recording scheme, and excellent reserve stability and ejection stability of the resin ink can be achieved.

The resin emulsion is not limited to the following examples, but may be (meth)acrylic acid, (meth)acrylic acid ester, acrylonitrile, cyanoacrylate, acrylamide, olefin, styrene, vinyl acetate, vinyl chloride, vinyl alcohol, vinyl ether, vinylpyrrolidone, vinylpyridine, vinylcarbazole, vinylimidazole, homo polymer or copolymer of vinylidene chloride, fluorine resin, and natural resin, for example. Particularly, at least one of the (meth)acrylic type resin and the styrene-(meth)acrylic acid copolymer type resin is preferable, and at least one of the acrylic type resin and the styrene-acrylic acid copolymer type resin is more preferable, and the styrene-acrylic acid copolymer type resin is further more preferable. In addition, the above copolymer may be in the any form among random copolymer, block copolymer, alternate copolymer, and graft copolymer.

As the above resin emulsion, resin emulsion which is obtained from known materials by a known manufacturing method may be used, and a commercialized product may be also used. The commercialized product is not limited to the following examples, but may be MICROGEL E-1002, MICROGEL E-5002 (all of which are product names and manufactured by Nippon Paint Co., Ltd), BONKOTE 4001, BONKOTE 5454 (all of which are product names and manufactured by DIC Corporation), SAE 1014 (which is a product name and manufactured by Zeon Corporation), SAIVINOLSK-200 (which is a product name and manufactured by SAIDEN CHEMICAL INDUSTRY CO., LTD.), JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, JONCRYL 7610 (all of which are product names and manufactured by BASF Ltd.).

The average particle size of the resin emulsion is preferably within a range from 5 nm to 400 nm and more preferably within a range from 20 nm to 300 nm in order to achieve further satisfactory reserve stability and ejection stability of the ink.

The content of the resin emulsion is preferably within a range from 0.5% by mass to 7% by mass with respect to the total mass (100% by mass) of the resin ink. If the content is within the above range, it is possible to reduce the solid content concentration and to thereby achieve further satisfactory ejection stability.

Wax

The resin ink according to this embodiment preferably contains wax. By containing wax in the resin ink, the resin ink exhibits a more excellent fixing property on the ink non-absorbable or low-absorbable recording medium. Among various kinds of wax, emulsion type wax is more preferable. The above wax is not limited to the following examples, but may be polyethylene wax emulsion, paraffin was emulsion, or polyolefin wax, for example, and particularly, at least one of polyethylene wax emulsion and paraffin wax emulsion is preferable.

In this specification, "wax emulsion" mainly means solid wax particles dispersed in water by using a surfactant.

Paraffin Wax Emulsion

If the resin ink contains paraffin wax emulsion a slippery property is given to the recorded substance, and thereby the ink exhibit excellent scrubbing resistance. In addition, since the paraffin wax has a water-repellent property, it is possible to obtain satisfactory water resistance of the recorded substance.

The "paraffin wax" in this specification means so-called petroleum-based wax and means mixture of hydrocarbon with weight-average molecular weight of about 300 to 500 which contains linear paraffinic hydrocarbon (normal paraffin) with about 20 to 30 carbons as a main component and contains a small amount of isoparaffin.

Since the resin ink according to this embodiment contains the paraffin wax in the emulsion state, the ink viscosity can be easily adjusted to a range which is appropriate for the ink jet recording scheme, and further excellent reserve stability and ejection stability of ink can be achieved.

A melting point of the paraffin wax emulsion is preferably 110° C. or lower in order to further strengthen the membrane of the recorded substance and further enhance scrubbing resistance of an image. On the other hand, the lower limit of the melting point of the paraffin wax emulsion is preferably 60° C. or higher in order prevent the recording surface from drying and becoming sticky. Furthermore, the above melting point is more preferably from 70° C. to 95° C. in order to achieve further satisfactory ejection stability of the ink.

The average particle size of the paraffin wax emulsion is preferably within a range from 5 nm to 400 nm and more preferably within a range from 50 nm to 200 nm in order to obtain a stable emulsion state and achieve further satisfactory the reserve stability and the ejection stability of the ink. As the paraffin wax emulsion, a commercialized product may be directly used. The commercialized product is not limited to the following examples, but may be AQUACER 537 and AQUACER 539 (both of which are product names and manufactured by BYK).

The content (as solid content) of the paraffin wax emulsion is preferably within a range from 0.1% by mass to 3% by mass, more preferably within a range from 0.3% by mass to 3% by mass, and further more preferably within a range from 0.3% by mass to 1.5% by mass with respect to the total mass (100% by mass) of the ink. If the content is within the above range, it is possible to form an image, which is further excellent in the scrubbing resistance, blocking resistance, and water resistance, on the ink non-absorbable or low-absorbable recording medium, and obtain ink which is excellent in preventing clogging.

Polyethylene Wax Emulsion

By containing polyethylene wax emulsion in the above resin ink, it is possible to cause the ink to have excellent scrubbing resistance.

A method for manufacturing polyethylene wax emulsion will be exemplified. Polyethylene wax is produced by polymerizing ethylene or reducing molecular weight of general shaping polyethylene through thermal decomposition. Then, the polyethylene wax is oxidized, a carboxyl group or a hydroxyl group is added thereto, the resulting substance is emulsified by further using a surfactant, and the polyethylene wax emulsion in a form of a water-based wax emulsion which exhibits excellent stability is then obtained.

As the polyethylene wax emulsion, a commercialized product may be directly used. The commercialized product is not limited to the following examples, but may be NOPCOTE PEM-17 (which is a product name and manufactured by SANNOPCO LIMITED), CHEMIPEARL W4005 (which is a product name and manufactured by Mitsui Chemicals, Inc.), AQUACER 515, AQUACER 593 (both of which are product names and manufactured by BYK), for example.

The average particle size of the polyethylene wax emulsion is preferably within a range from 5 nm to 400 nm, and more preferably within a range from 50 nm to 200 nm in order to achieve further satisfactory reserve stability and ejection stability of the ink.

The content (as solid content) of the polyethylene wax emulsion is preferably within a range from 0.1% by mass to 3% by mass, more preferably within a range from 0.3% by mass to 3% by mass, and further more preferably within a range from 0.3% by mass to 1.5% by mass, independently, with respect to the total mass (100% by mass) of the ink. If the content is within the above range, it is possible to satisfactorily solidify and fix the ink even on the ink non-absorbable or low-absorbable recording medium, and further excellent reserve stability and ejection stability of the ink can be achieved.

Surfactant

The resin ink according to this embodiment may contain a surfactant. The surfactant is not limited to the following examples, but may be a nonionic surfactant, for example. The nonionic surfactant acts to uniformly disperse the ink on the recording medium. For this reason, it is possible to obtain a high-definition image with substantially no bleeding when ink jet recording is performed by using the ink which contains the nonionic surfactant. Such nonionic surfactants are not limited to the following examples, but may be acetylenic glycol type surfactant, silicon type surfactant, polyoxyethylene alkyl ether type surfactant, polyoxypropylene alkyl ether type surfactant, polycyclic phenyl ether type surfactant, sorbitan derivative, and fluorine type surfactant, for example, and particularly, at least one of the acetylenic glycol type surfactant and the silicon type surfactant is preferable.

Acetylenic Glycol Type Surfactant

The acetylenic glycol type surfactant is more excellent in an ability of appropriately holding surface tension and boundary tension than other kinds of nonionic surfactants, and foam is not substantially generated. Therefore, the ink which contains the acetylenic glycol type surfactant can appropriately hold boundary tension and surface tension with printer members such as the nozzle surface of the head, which are brought into contact with the ink. For this reason, it is possible to achieve satisfactory ejection stability by using the ink, which contains the acetylenic glycol type surfactant, in the ink jet recording scheme. In addition, since the acetylenic glycol type surfactant exhibits satisfactory affinity (wettability) and permeability for the recording medium, an image recorded by using the resin ink which contains the acetylenic glycol type surfactant is a high-definition image with substantially no bleeding.

The acetylenic glycol type surfactant is not particularly limited, but may be SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, (all of which are product names and manufactured by Air Products and Chemicals. Inc.), OLFINE B, Y, P, A, STG, SPC, E1004, E1010, PD-001, PD-002W, PD-003, PD-004, EXP.4001, EXP.4036, EXP.4051, AF-103, AF-104, AK-02, SK-14, AE-3, DF110D (all of which are product names and manufactured by Nissin Chemical Industry Co., Ltd.), and ACETYLENOLE E00, E00P, E40, E100 (all of which are product names and manufactured by Kawaken Fine Chemical Co., Ltd.), for example.

One kind or two or more kinds of the acetylenic glycol type surfactant may be used alone or in combination.

The content of the acetylenic glycol type surfactant is preferably equal to or more than 0.1% by mass and equal to or less than 3% by mass with respect to the total mass (100% by mass) of the ink since further satisfactory reserve stability and ejection stability of the ink can be achieved.

Silicon Type Surfactant

The silicon type surfactant is more excellent in an action of uniformly dispersing the ink on the recording medium without generating bleeding than other kinds of nonionic surfactants.

The silicon type surfactant is not particularly limited, but preferable examples thereof include a polysiloxane type compound. The polysiloxane type compound is not particularly limited, but may be Polyether-modified organosiloxane, for example. Examples of a commercialized product of Polyether-modified organosiloxane include BYK-306, BYK-307, BYK-333, BYK-341, BYK-345, BYK-346, BYK-348 (all of which are product names and manufactured by BYK), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (all of which are product names and manufactured by Shin-Etsu Chemical Co., Ltd.).

One kind or two or more kinds of the silicon type surfactant may be used alone or in combination.

The content of the silicon type surfactant is preferably equal to or more than 0.1% by mass and equal to or less than 3% by mass with respect to the total mass (100% by mass) of the ink in order to achieve further satisfactory reserve stability and ejection stability of the ink.

Water

The resin ink according to this embodiment may contain water. Particularly, when the ink is a water-based ink, water is a main medium of the ink and a component which is evaporated and scattered when the recording medium is heated in the ink jet recording.

Examples of the water include ion-exchanged water, ultrafiltration water, reverse osmosis water, pure water such as distilled water, and water from which ionic impurities are removed as much as possible, such as ultrapure water. In addition, if water sterilized by irradiating with ultraviolet rays or adding hydrogen peroxide thereto is used, it is possible to prevent fungi and bacteria from being generated when the pigment dispersed liquid and the ink using the pigment dispersed liquid are reserved for long time.

Organic Solvent

The resin ink according to this embodiment may contain volatile water-soluble organic solvent.

The organic solvent is not limited to the following examples, but may be alcohols or glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propylether, ethylene glycol mono-iso-propylether, diethylene glycol mono-iso-propylether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, propylene glycol monomethyl ether, propylene glycol monoethyl ether, propylene glycol mono-t-butyl ether, propylene glycol mono-n-propylether, propylene glycol mono-iso-propylether, propylene glycol mono-n-butyl ether, dipropylene glycol mono-n-butyl ether, dipropylene glycol mono-n-propylether, dipropylene glycol mono-iso-propylether, diethylene glycoldimethyl ether, diethylene glycol diethyl ether, diethylene glycol dibutyl ether, diethylene glycol ethyl methyl ether, diethylene glycol butyl methyl ether, triethylene glycoldimethyl ether, tetraethylene glycol dimethyl ether, dipropylene glycol dimethyl ether, dipropylene glycol diethyl ether, tripropylene glycoldimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol, N,N-dimethylformamide, N,N-dimethylacetamide, 2-pyrolidone, N-methyl-2-pyrolidone, 2-oxazolidone, 1,3-dimethyl-2-imidazolidinone, dimethylsulfoxide, sulfolane, and 1,1,3,3-tetramethylurea.

Other Components

The resin ink according to this embodiment may further contain pH adjuster such as potassium hydroxide, antiseptic agent and fungicide, rust prevention agent, chelator, and the like in addition to the above components.

Manufacturing Method of Resin Ink

The resin ink according to this embodiment can be obtained by mixing the aforementioned components (materials) in an arbitrary order, filtering the mixture as necessary, and removing impurities therefrom. Here, the pigment is preferably mixed after being prepared in a state in which the pigment is uniformly dispersed in solvent in order to simplify handling thereof.

As a method for mixing the respective materials, a method in which the materials are sequentially added, stirred, and mixed in a container provided with a stirrer such as a mechanical stirrer or a magnetic stirrer is preferably used. As a filtration method, centrifugal filtration or filtration by a filter can be performed as necessary.

Examples

Hereinafter, a detailed description will be given of the invention based on Examples. However, the invention is not limited thereto.

Used Materials

The following materials were used in Examples and Comparative Examples.

Pigment: C.I. PIGMENT BLACK 7
Resin emulsion: styrene-acrylic acid copolymer type resin emulsion (Tg: 85° C., average particle size: 140 nm)
Polyethylene wax emulsion: AQUACER 515 (Product name of BYK), NOPCPTE PEM-17 (Product name of SAN-NOPCO LIMITED)
Silicon type surfactant: BYK 348 (Product name of BYK)
Acetylenic glycol type surfactant: SURFYNOL DF110D (Product name of Air Products and Chemicals. Inc.)
Others: 1,2-hexanediol, 2-pyrolidon, propylene glycol Preparation of Pigment Dispersed Liquid 40 parts by mass of water-solution resin (obtained by copolymerizing methacrylic acid/butylacrylate/styrene/hydroxyethyl acrylate at a mass ratio of 25/50/15/10; weight-average molecular weight of 12,000) was introduced into liquid obtained by mixing 7 parts by mass of potassium hydroxide, 23 parts by mass of water, and 30 parts by mass of triethylene glycol-mono-n-butyl ether, the mixture was stirred and heated at 80° C. to prepare aqueous resin solution.

To 1.75 kg of the above resin aqueous resin solution (43% as solid content), 3.0 kg of C.I. PIGMENT BLACK 7 and 10.25 kg of water were respectively blended, the mixture was stirred by a mixing stirrer for pre-mixing, and mixed solution was obtained. By using a horizontal bead mill which was filled with zirconia beads with a size of 0.5 mm at 85%, had an effective volume of 1.5 liters, and was provided with multiple disc impellers, the above mixed solution was dispersed based on a multi pass scheme. Specifically, the dispersion was performed in two passes at a beads circumferential velocity of 8 m/second with an ejection amount of 30 liters per an hour, and pigment dispersed mixed solution with an average particle size of 325 nm was obtained. Next, the pigment dispersed mixed solution was subjected to circulation dispersion by using horizontal annular bead mill which was filled with zirconia beads with a size of 0.05 mm at 95% and had an effective volume of 1.5 liters. By using a screen with a size of 0.015 mm, 10 kg of the pigment dispersed mixed solution was subjected to the dispersion processing at a bead circumferential velocity of 10 m/second at a circulation amount of 300 liters/hour for four hours, and water-based pigment dispersed liquid containing the pigment at 20% as solid content and water-soluble resin at 5% was obtained.

Ink Preparation

The thus prepared pigment dispersed solution was prepared at an amount at which C.I. PIGMENT BLACK 7 was contained at 2.5% by mass. To the pigment dispersed solution, 5% by mass of 1,2-hexanediol, 15% by mass of 2-pyrolidone, 10% by mass of propylene glycol, 1% by mass of styrene-acrylic acid copolymer type resin emulsion, 0.5% by mass of polyethylene wax emulsion (AQUACER 515), 0.5% by mass of polyethylene wax emulsion (NOPCOTE PEM-17), 0.5% by mass of silicon type surfactant, 0.5% by mass of acetylenic glycol type surfactant are added, pure water was added as the remainder, and the ink was prepared. The ink was prepared by pouring the respective components in a container, stirring and mixing the respective components by a magnetic stirrer for two hours, and then filtering the mixture with a membrane filter with a pore diameter of 5 μm to remove impurities such as foreign particles and coarse particles.

Evaluation Method

The printer PX-H10000 (manufactured by Seiko Epson Corporation) was used. By using an infrared heater attached to the printer, a vinyl chloride film (product name: LLSP EX113, manufactured by Sakurai Co., Ltd.) as a recording medium which was positioned in a region in which the ejected resin ink adhered was heated to 50° C. The temperature was measured by a thermograph using an infrared thermography apparatus H2640/H2630 (manufactured by NEC Avio Infrared Technologies Co., Ltd.).

The first cleaning was performed every twenty minutes, and wiping was performed after the first cleaning by pressing a cloth wiping sheet against the nozzle surface. The second cleaning was performed for every pass.

Continuous Recording Stability

The thus prepared ink was continuously ejected onto the vinyl chloride film for two hours for ink jet recording, and presence of dot defects was observed.

Evaluation criteria are as follows. Evaluation results will be shown in Table.

A: In not more than three nozzles, dot defects occurred in the recording for two hours.

B: In more than three and not more than 10 nozzles, dot defects occurred in the recording for two hours.

C: In more than 10 nozzles, dot defects occurred in the recording for two hours.

Intermittent Recording Stability

It was confirmed how many times the ejection was required to recover all the nozzles when idle running was continued for sixty minutes and then printing (recording) was started. In addition, idle running means a state in which the piezoelectric element is minutely vibrated to move the meniscus without performing printing and the second cleaning is periodically performed.

A: All the nozzles were recovered after the ejection of not more than three times in the recording after the idle running for sixty minutes.

B: All the nozzles were recovered after the ejection of more than three times and not more than seven times in the recording after the idle running for sixty minutes.

C: All the nozzles were recovered after the ejection of more than seven times in the recording after the idle running for sixty minutes.

TABLE

| | Example 1 | Example 2 | Example 3 | Comparative Example 1 | Comparative Example 2 | Comparative Example 3 | Comparative Example 4 |
|---|---|---|---|---|---|---|---|
| First cleaning | Done | Done | Done | Not done | Not done | Done | Done |
| Wiping with cloth sheet | Done | Done | Not done | Done | Done | Not done | Done |
| Wiping with rubber blade | Not done | Not done | Done | Not done | Not done | Not done | Not done |
| Second cleaning | Done | Done | Done | Done | Done | Done | Not done |
| Amount of cleaning with respect cavity | 200% | 100% | 200% | — | 60% | 200% | 200% |
| Continuous recording stability | A | A | B | B | A | C | C |
| Intermittent recording stability | A | B | A | C | C | A | C |

In Table, the first cleaning was performed in the respective Examples and Comparative Example 3 in which the amount of the cleaning with respect to the cavity is not less than 80%. In Comparative Example 2, the first cleaning corresponds to "Not done" since the amount of the cleaning with respect to the cavity is less than 80%.

It was discovered from Table that the ink jet recording apparatus (respective Examples) including: a head which ejects predetermined resin ink from a nozzle formed on a nozzle surface to a recording medium; a heating mechanism which heats the recording medium positioned in a region in which the ejected ink adheres; first cleaning which moves the head to an ink receiving medium, performs non-recording ejection of the ink from the head to the ink receiving medium, and cleans the nozzle and the nozzle surface of the head; second cleaning which cleans the nozzle of the head; and a wiping mechanism which wipes the nozzle surface by using a wiping member when the non-recording ejection was performed by the first cleaning is excellent both in continuous recording stability and in intermittent recording stability as compared with the other ink jet recording apparatuses (respective Comparative Examples).

What is claimed is:

1. An ink jet recording apparatus comprising:
    a print head which ejects ink for ink jet recording, which contains resin and substantially does not contain alkyl polyol whose boiling point under 1 atmospheric pressure is 280° C. or higher from a nozzle formed on a nozzle surface to a recording medium;
    a heating mechanism which heats the recording medium positioned in a region in which the ejected ink for ink jet recording adheres;
    first cleaning which moves the print head to an ink receiving medium, performs non-recording ejection of the ink for ink jet recording from the print head to the ink receiving medium, and cleans the nozzle and the nozzle surface of the print head;
    second cleaning which moves the print head to the ink receiving medium, performs non-recording ejection of a smaller amount of the ink for ink jet recording than an amount of the ink ejected in the non-recording ejection by the first cleaning from the print head to the ink receiving medium at a higher execution frequency, and cleans the nozzle of the print head; and
    a wiping mechanism which wipes the ink adhering to the nozzle surface by using a wiping member.

2. The ink jet recording apparatus according to claim 1, wherein the wiping member is a cloth wiping sheet.

3. The ink jet recording apparatus according to claim 1, wherein when the first cleaning is performed, the wiping member wipes the nozzle surface.

4. The ink jet recording apparatus according to claim 1, wherein the first cleaning is performed in units of predetermined time during recording, non-ejection time of the nozzle, or a number of pages.

5. The ink jet recording apparatus according to claim 1, wherein the first cleaning is configured such that at least one of an amount of ink ejected in the non-recording ejection or an execution frequency of the non-recording ejection is changeable and adjustable for each nozzle depending on a use frequency of each nozzle.

6. The ink jet recording apparatus according to claim 1, wherein the ink for ink jet recording contains wax.

7. The ink jet recording apparatus according to claim 1, wherein the wiping member does not wipe the nozzle surface when the second cleaning is performed.

8. The ink jet recording apparatus according to claim 1, wherein the second cleaning is performed for every pass.

* * * * *